(12) United States Patent
Smith

(10) Patent No.: US 12,154,050 B2
(45) Date of Patent: Nov. 26, 2024

(54) SYSTEMS AND METHODS FOR CREATING PERSONALIZED PUBLIC TRANSIT GUIDES

(71) Applicant: QUANATA, LLC, San Francisco, CA (US)

(72) Inventor: Bennett Smith, Inver Grove, MN (US)

(73) Assignee: QUANATA, LLC, San Francisco, CA (US)

( * ) Notice: Subject to any disclaimer, the term of this patent is extended or adjusted under 35 U.S.C. 154(b) by 297 days.

(21) Appl. No.: 16/807,701

(22) Filed: Mar. 3, 2020

(65) Prior Publication Data
US 2023/0116055 A1    Apr. 13, 2023

(51) Int. Cl.
| | |
|---|---|
| *G06Q 10/0631* | (2023.01) |
| *G01C 21/34* | (2006.01) |
| *G06F 16/9535* | (2019.01) |
| *G06F 16/9537* | (2019.01) |
| *G06Q 30/0207* | (2023.01) |
| *G06Q 40/08* | (2012.01) |
| *G06Q 50/40* | (2024.01) |
| *G07C 5/00* | (2006.01) |
| *H04W 4/029* | (2018.01) |

(52) U.S. Cl.
CPC ... *G06Q 10/06314* (2013.01); *G01C 21/3407* (2013.01); *G06F 16/9535* (2019.01); *G06F 16/9537* (2019.01); *G06Q 10/06312* (2013.01); *G06Q 30/0215* (2013.01); *G06Q 40/08* (2013.01); *G06Q 50/40* (2024.01); *G07C 5/008* (2013.01); *H04W 4/029* (2018.02)

(58) Field of Classification Search
CPC ....... G06Q 10/063; G06Q 40/08; G06Q 50/30
See application file for complete search history.

(56) References Cited

U.S. PATENT DOCUMENTS

| | | | |
|---|---|---|---|
| 8,799,032 B2 | 8/2014 | Fernandes et al. | |
| 9,014,968 B2 | 4/2015 | Watkins | |
| 10,060,752 B2 * | 8/2018 | Salowitz | G08G 1/123 |
| 10,097,947 B2 * | 10/2018 | von Cavallar | G06Q 50/01 |

(Continued)

*Primary Examiner* — Scott S Trotter
*Assistant Examiner* — William D Newlon
(74) *Attorney, Agent, or Firm* — BRYAN CAVE LEIGHTON PAISNER LLP

(57) ABSTRACT

A computer system for generating a public transportation schedule for users is provided. The computer system includes a processor in communication with a memory device, and the processor may be programmed to: (i) receive telematics data associated with a user, wherein the telematics data include location data associated with the user, and wherein the telematics data are received from at least one of a mobile device associated with the user, a vehicle associated with the user, and a public transportation vehicle utilized by the user, (ii) generate, based at least in part upon the telematics data, one or more travel patterns associated with the user, (iii) retrieve one or more public transportation routes from the memory device, wherein the one or more public transportation routes are associated with a location associated with the user, (iv) compare the one or more travel patterns and the one or more public transportation routes, and/or (v) generate a public transportation schedule for the user based at least in part upon the compared one or more travel patterns and the one or more public transportation routes.

20 Claims, 6 Drawing Sheets

(56) References Cited

U.S. PATENT DOCUMENTS

| | | | |
|---|---|---|---|
| 10,121,162 B2 | 11/2018 | Fletcher et al. | |
| 10,895,463 B1 * | 1/2021 | Cope | G06Q 10/02 |
| 11,092,455 B2 * | 8/2021 | Rowley | G08G 1/096811 |
| 11,276,257 B2 * | 3/2022 | Moghtadai | G06N 3/045 |
| 2008/0082403 A1 * | 4/2008 | Adegoke | G06Q 10/06 705/14.69 |
| 2009/0088973 A1 * | 4/2009 | Watkins | G01C 21/3691 701/469 |
| 2009/0287408 A1 * | 11/2009 | Gerdes | G01C 21/3423 701/533 |
| 2010/0205060 A1 * | 8/2010 | Athsani | G01C 21/3484 705/14.58 |
| 2012/0130727 A1 * | 5/2012 | Ahmed | G06Q 30/02 705/1.1 |
| 2014/0229255 A1 * | 8/2014 | Scofield | G06Q 30/0207 705/14.1 |
| 2016/0231129 A1 | 8/2016 | Erez et al. | |
| 2016/0232550 A1 * | 8/2016 | Fletcher | G06Q 30/0226 |
| 2018/0283890 A1 * | 10/2018 | Zhao | G06Q 30/0206 |
| 2018/0338223 A1 | 11/2018 | Park | |
| 2020/0209000 A1 * | 7/2020 | Oltramari | G01C 21/3697 |
| 2021/0182993 A1 * | 6/2021 | Arian | G06Q 30/02 |
| 2021/0272207 A1 * | 9/2021 | Fields | H04N 7/188 |

\* cited by examiner

SYSTEMS AND METHODS FOR CREATING PERSONALIZED PUBLIC TRANSIT GUIDES

FIELD OF THE DISCLOSURE

The present disclosure relates to generating public transit routes for users, and more particularly, to systems and methods for generating public transit routes for users based at least in part upon telematics data associated with the users and providing rewards to the users based at least in part upon how often the users take the generated public transit routes.

BACKGROUND

The desire to take public transportation has increased recently due to a multitude of factors like people becoming more environmentally conscious, an increase of prices associated with owning a vehicle (e.g., parking and gas costs), and an increase of traffic and congestion in cities. Further, public transportation allows people to be productive during their commutes, as compared to driving a vehicle (e.g., people can read, respond to emails, etc.).

However, known methods of determining one or more public transportation routes take a large amount of time, effort, and trial-and-error for users to determine the best and most efficient routes for their commutes. Also, users may have a hard time planning other routine trips (e.g., going to the gym, grocery store, coffee shops, etc.) in addition to their commutes. Accordingly, even though users may desire to take public transportation, they may not want to go through the effort of trying to find one or more public transportation routes that most efficiently meet their needs. There is a need for determining dynamic one or more public transportation routes for users with little input from the users, such that the users are encouraged to take public transportation.

BRIEF SUMMARY

The present embodiments may relate to systems and methods for generating a public transportation schedule for users. The system may include a public transit route server that carries out the methods.

In one aspect, a computer system for generating a public transportation schedule for users may be provided. The computer system may include one processor in communication with at least one memory device, and the at least one processor may be configured to: (i) receive telematics data associated with a user, wherein the telematics data include location data associated with the user, and wherein the telematics data are received from at least one of a mobile device associated with the user, a vehicle associated with the user, and a public transportation vehicle utilized by the user, (ii) generate, based at least in part upon the received telematics data, one or more travel patterns associated with the user, (iii) retrieve one or more public transportation routes from the at least one memory device, wherein the one or more public transportation routes are associated with a location associated with the user, (iv) compare the one or more travel patterns and the one or more public transportation routes, and (v) generate a public transportation schedule for the user based at least in part upon the compared one or more travel patterns and the one or more public transportation routes. The computer system may include additional, less, or alternate functionality, including that discussed elsewhere herein.

In another aspect, a computer-based method for generating a public transportation schedule for users may be provided. The method may be implemented on a computer device including one processor in communication with at least one memory device, and the method may include: (i) receiving telematics data associated with a user, wherein the telematics data include location data associated with the user, and wherein the telematics data are received from at least one of a mobile device associated with the user, a vehicle associated with the user, and a public transportation vehicle utilized by the user, (ii) generating, based at least in part upon the received telematics data, one or more travel patterns associated with the user, (iii) retrieving one or more public transportation routes from the at least one memory device, wherein the one or more public transportation routes are associated with a location associated with the user, (iv) comparing the one or more travel patterns and the one or more public transportation routes, and (v) generating a public transportation schedule for the user based at least in part upon the compared one or more travel patterns and the one or more public transportation routes. The method may include additional, less, or alternate actions, including those discussed elsewhere herein.

In yet another aspect, at least one non-transitory computer-readable storage media having computer-executable instructions embodied thereon may be provided. When executed by at least one processor in communication with at least one memory device, the computer-executable instructions may cause the at least one processor to: (i) receive telematics data associated with a user, wherein the telematics data include location data associated with the user, and wherein the telematics data are received from at least one of a mobile device associated with the user, a vehicle associated with the user, and a public transportation vehicle utilized by the user, (ii) generate, based at least in part upon the received telematics data, one or more travel patterns associated with the user, (iii) retrieve one or more public transportation routes from the at least one memory device, wherein the one or more public transportation routes are associated with a location associated with the user, (iv) compare the one or more travel patterns and the one or more public transportation routes, and (v) generate a public transportation schedule for the user based at least in part upon the compared one or more travel patterns and the one or more public transportation routes. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Depending upon the embodiment, one or more benefits may be achieved. These benefits and various additional objects, features and advantages of the present disclosure can be fully appreciated with reference to the detailed description and accompanying drawings that follow.

Figure 1:
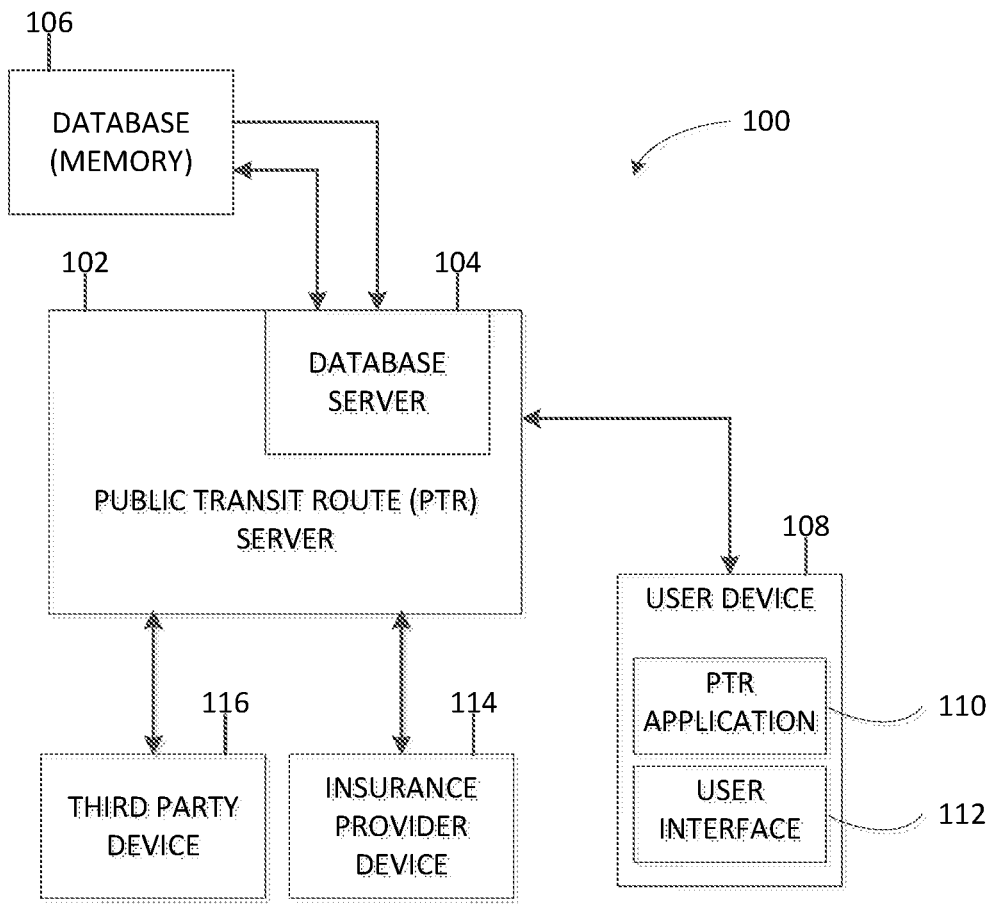
FIG. 1 illustrates a simplified block diagram of an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the present disclosure.

DETAILED DESCRIPTION OF THE DRAWINGS

The present embodiments may relate to, inter alia, systems and methods for generating public transportation/transit schedules for users based at least in part upon telematics data associated with the users. In one exemplary embodiment, the methods may be performed by a public transit route (PTR) server (also referred to herein as a "PTR computing device" and a "PTR computer system").

As described herein, the PTR server may be associated with a PTR application that may be accessed by user devices (e.g., mobile devices associated with the users). In some embodiments, the PTR server may be associated with an insurance provider, and the PTR server may provide rewards to the users (e.g., in association with the insurance provider and/or on behalf of the insurance provider) for using the generated public transportation schedules. Further, in some embodiments, the users may be insured by a usage based insurance (UBI) policy through the insurance provider.

Examples of Telematics Data

In the exemplary embodiment, one or more users may enroll and/or opt-in to a public transit route (PTR) service provided by the PTR server, and in response, the PTR server may receive telematics data associated with the user. The telematics data may include location data and any data associated with the operation of a vehicle associated with the user (e.g., a vehicle that the user drives or rides in). In some embodiments, the PTR service may be a public transit route (PTR) application associated with the PTR server and may be installed on a user device (e.g., a mobile device) associated with the user. Accordingly, the telematics data associated with the user may come from sensors associated with the user device (e.g., GPS, accelerometer data, gyroscope data, etc.). Further, the telematics data may come from sensors (e.g., GPS, brake pad sensors, etc.) of the vehicle associated with the user or the vehicle being used by the user (e.g., a public transit vehicle, a ride sharing vehicle, a taxi, etc.).

The PTR server may receive telematics data from the vehicle and/or user device running the PTR application, and the telematics data may indicate how the user operates the vehicle (e.g., where the vehicle was driven, how fast the vehicle was driven, if the vehicle made any sudden stops or quick lane changes, general driving quality associated with the user, braking, cornering, speed, acceleration, deceleration, heading, route, time of day, GPS location, etc.). The PTR server may receive the telematics data from the vehicle and/or user device periodically (e.g., every night, at the end of every week, at the end of every month, etc.) and/or after certain events (e.g., after a trip associated with the user is completed). The PTR server may store (e.g., in a database associated with the PTR server) the telematics data for the user such that the PTR server may retrieve the telematics data associated with the user to determine driving patterns associated with the user.

Examples of Generating One or More Travel Patterns

The PTR server may, based at least in part upon the telematics data associated with the user, generate one or more travel patterns associated with the user. The PTR server may use modeling techniques, machine learning techniques, and/or artificial intelligence techniques to generate the one or more travel patterns associated with the user. For example, the PTR server may model the telematics data to determine one or more travel patterns associated with the user and/or the PTR server may use machine learning techniques on the telematics data to predict one or more travel patterns and/or routes associated with the user. Generated one or more travel patterns associated with the user may include locations where the user generally drives the vehicle, times associated with the frequent locations of the vehicle, a commute associated with the user, routine trips associated with the user in addition to the commute associated with the user, commute time associated with the user, average traffic associated with the commute associated with the user, when the user utilizes mass transit vehicles or other personal mobility devices (e.g., bikes or scooters), etc.

The PTR server may receive telematics data (e.g., from the user device) associated with the user, for example, over a month. The PTR server may model the telematics data and generate one or more travel patterns associated with the user based at least in part upon the modeled telematics data. The PTR server may determine a commute associated with the user (e.g., based at least in part upon location associated with the user on business days), an average time of the commute associated with the user (e.g., based at least in part upon how long it takes the user to go from home to work, and vice versa), and routine trips associated with the user (e.g., based at least in part upon other frequent locations associated with the user besides home and work). For example, the PTR server may determine that the user commutes from their residence in San Jose to their workplace in San Francisco, that the commute time associated with the user is an hour to work and an hour and 45 minutes coming home from work, and that the user typically gets coffee at a specific coffee shop on Monday, Wednesday, and Friday mornings on the way to work, that the user typically goes to the gym Tuesday and Thursday nights after work, and that the user goes grocery shopping on Sunday afternoons. The PTR server may store (e.g., in a database associated with the PTR server) the generated one or more travel patterns for the user such that the PTR server may retrieve the generated one or more travel patterns to determine a public transportation schedule for the user.

Examples of Generating Public Transportation Schedules

Once the PTR server has generated one or more travel patterns associated with the user, the PTR server may retrieve one or more public transportation routes that correspond with the location associated with the user (e.g., the city or state of the workplace or residence associated with the user). The one or more public transportation routes may be retrieved from databases associated with the PTR server and/or databases associated with the public transportation providers. For example, the one or more public transportation routes may be retrieved from websites, online databases, and/or mobile applications of the public transportation providers. The one or more public transportation routes may include bus routes and schedules, train (e.g., subway, elevated train, underground, etc.) routes and schedules, streetcar routes and schedules, trolley routes and schedules, ferry routes and schedules, tram routes and schedules, rapid transit routes and schedules, personal mobility locations and pick-up/drop-off areas, and/or the route and schedule of any other mode of public transportation. The PTR server may retrieve the one or more public transportation routes based at least in part upon the frequent locations associated with the user (e.g., the cities, states, and/or areas the user frequents). For example, if the PTR server determines that the residence associated with the user is in New Jersey and the user commutes to their workplace in New York City every business day, the PTR server may retrieve New Jersey one or more public transportation routes, New York City one or more public transportation routes, and/or greater New York City one or more public transportation routes.

The PTR server may compare the generated one or more travel patterns associated with the user to the retrieved one or more public transportation routes to generate a public transportation schedule for the user. That is, the PTR server may determine a public transportation schedule for the user based at least in part upon their commute, commute time, routine trips, and/or other generated one or more travel patterns associated with the user. The public transportation schedule may be a schedule for the user to follow that includes some public transportation. For example, the public transportation schedule may include specific trains and buses for the user to take to/from work, the gym, grocery shopping, etc. such that the user can replace at least some of the time that the user drives their personal vehicle with public transportation. In some embodiments, the PTR server may prompt (e.g., through the PTR application on the user device) the user to select different one or more preferences before the PTR server generates the public transportation schedule for the user. For example, the one or more preferences may include criteria that is important to the user (e.g., that the user would like the public transportation schedule that includes the fewest number of stops/transfers, that takes the shortest amount of time, that only includes train routes or bus routes, or that the user does not have to drive at all, etc.). In other embodiments, the PTR server may generate the public transportation schedule based at least in part upon predetermined criteria (e.g., the schedule may be based at least in part upon taking no more time than the current commute associated with the user or not needing transfers between different modes of transportation). Additionally, the PTR server may generate multiple public transportation schedules for the user and prompt the user (e.g., through the PTR application) to choose which of the generated public transportation schedules the user would like to take. Further, if the PTR server determines that the user already uses public transportation for traveling, the PTR server may suggest alternate routes to the user that may be, for example, more efficient or easier for the user.

The determined public transportation schedule may be dynamic in that the PTR server may update the public transportation schedule, for example, periodically (e.g., every other week, every month, every two months, etc.) if better public transportation schedules are found, when the generated one or more travel patterns associated with the user change (e.g., if the user walks in a park after work during the summer instead of going to the gym), and/or when delays or disruptions in the public transportation schedule arise (e.g., if construction interferes with the public transportation schedule, when a mode of transportation is significantly delayed, when a parade, festival, or marathon interferes with the public transportation schedule, etc.). The PTR server may receive real-time updates from the public transportation providers and may adjust the public transportation schedules accordingly. Additionally, the determined one or more public transportation routes may be dynamic in that the PTR server may generate different public transportation schedules for different days depending on the generated one or more travel patterns associated with the user (e.g., the one or more travel patterns may show that the user has different routines or schedules for different days like going to work late on Monday mornings or leaving work early on Friday afternoons). Further, the determined public transportation schedules may be dynamic in that the PTR server may change and/or update the generated public transportation schedules based at least in part upon user input. For example, the user may input (e.g., through the PTR application on the user device) that the user is not going to the gym after work or that the user wishes to avoid a certain train or bus of the generated public transportation schedule (e.g., because the user heard that there were significant delays and/or the user heard that the train or bus was especially crowded).

The PTR server may generate the public transportation schedule associated with the user based at least in part upon very little user input because the PTR server only needs passive data (e.g., telematics data) from the user to generate the public transportation schedule. The user may input only one or more preferences/changes that the user wishes to input. Accordingly, the PTR server makes taking public transportation easy and efficient for the user and tailors the public transportation schedule to satisfy the transportation needs and dynamic schedule associated with the user.

Examples of Determining an Actual Route Associated with the User

After the public transportation schedule associated with the user is generated, the PTR server may determine an actual route associated with the user. That is, the PTR server may use received telematics data associated with the user to determine whether or not the user has changed their one or more travel patterns to match the generated public transportation schedule. For example, the PTR server may compare actual location data (e.g., from the telematics data associated with the user) associated with the user with location data associated with the generated public transportation schedule to determine if the user is on track with the generated public transportation schedule. The PTR server may compare the actual route associated with the user to the generated public transportation schedule associated with the user to determine a percentage of time the user follows the generated public transportation schedule. The percentage of time that the user follows the generated public transportation schedule may be for any period of time (e.g., weekly, bi-weekly, monthly, bi-annually, etc.). For example, if the generated public transportation schedule includes the user going to a bus stop to get on a bus and the actual route associated with the user shows the user getting directly on an interstate from their residence, the PTR server may determine that the user did not follow the public transportation schedule for that day. If the user follows the public transportation schedule for every business day of a month except for that one day, the PTR server may determine that the percentage of time that the user followed the public transportation schedule for the month is 95% (e.g., 19/20). If the user only follows the public transportation schedule for 5 business days of the month, the PTR server may determine that the percentage of time that the user follows the public transportation schedule for the month is 25%.

In some embodiments, if the PTR server determines that the percentage of time that the user follows the public transportation schedule is consistently low (e.g., below 25% two months in a row), the PTR server may prompt the user to input one or more reasons the user is not using the public transportation schedule (e.g., too much additional time, out of the way, typically running late, etc.). The PTR server may update the public transportation schedule based at least in part upon the user input. In other embodiments, the PTR server may automatically update the public transportation route associated with the user if the percentage of time that the user follows the public transportation schedule is consistently low.

Further, the PTR server may use machine learning and/or artificial intelligence techniques on the actual routes of a plurality of users and the percentages of time that the users follow the public transportation schedules to continually update and improve the method of the PTR server of generating the public transportation schedules for users. For example, the machine learning/artificial intelligence techniques may find patterns in and/or attributes of generated public transportation schedules associated with high percentages of time the users follow the public transportation schedules. The PTR server may then try to replicate the found patterns in and/or attributes of the public transportation schedules in all public transportation schedules to raise the percentage of time that all users follow their respective generated public transportation schedules.

Examples of Providing Rewards

The PTR server may provide rewards to the user based at least in part upon the percentage of time that the user follows the public transportation schedule. That is, the PTR server may provide rewards to the user proportional to and/or representative of the percentage of time that the user follows the public transportation schedule. For example, if the user routinely follows (e.g., 90% of each month) the public transportation schedule, the PTR server may provide the user with a high reward since the percentage of usage is high. If the user rarely follows (e.g., 5% of each month) the public transportation schedule, the PTR server may provide the user with a very small reward (or no reward at all) since the percentage of usage is low. Further, in some embodiments, the PTR server may pre-define what percentages relate to high, intermediate, and low usage for the user. For example, the PTR server may define high usage as 80% and up, intermediate usage as between 50% and 85%, and low usage as below 50%. Additionally or alternatively, the PTR server may learn (e.g., based at least in part upon machine learning, artificial intelligence, or other techniques) what percentages relate to high, intermediate, and low usage for the user (e.g., by comparing the usage associated with the user to the usage of other users in the same area as the user). For example, if the user lives in an urban area with a lot of public transportation options and where most people take public transportation, the PTR server may determine that high usage is 90% and up, intermediate usage is between 75% and 90%, and low usage is under 75%. Further, if the user lives in a rural area where there are not a lot of public transportation options and where most people drive personal vehicles, the PTR server may determine that high usage is 50%, intermediate usage is between 35% and 50%, and low usage is below 35%.

In some embodiments, the PTR server may determine a reward associated with each of a plurality of public transportation schedules generated for the user. Each public transportation schedule of the plurality of public transportation schedules may be associated with a different reward because, for example, some of the public transportation schedules may take more effort for the user to follow (e.g., and may be associated with a higher reward) or may include not having the user drive at all (e.g., and also may be associated with a higher reward). When the user selects which public transportation schedule the user would like to take, the PTR server may store the selected public transportation schedule and corresponding reward (e.g., in a database associated with the PTR server). When the user completes the public transportation schedule, the PTR server may reward the user accordingly.

The PTR server may be associated with an insurance provider associated with the user, and the reward may include insurance rewards (e.g., credit toward a subsequent insurance premium and/or a percentage off the subsequent insurance premium). Further, since taking public transportation is generally more eco-friendly than individuals driving, the PTR server may provide rewards to the user from different third parties (e.g., city or state governments, environmentally-conscious companies, etc.) for the percentage of time that the user takes public transportation. The rewards may further include merchant gift cards, merchant coupons, cash rewards, digital wallet rewards, etc.

In some embodiments, the vehicle associated with the user may be insured by a usage-based insurance (UBI) policy through an insurance provider, and the usage-based insurance policy may be associated with an insurance premium. UBI policies for vehicles may be based at least in part upon how often the user uses the vehicle (e.g., how many miles the user drives the vehicle per month or how many days the user drives the vehicle per month) and differ from standard fixed policies that are based solely upon user information (e.g., risk, demographic, and location data). For example, users may prefer UBI policies if users do not regularly use their vehicles or do not drive many miles on their vehicle. Accordingly, the reward provided by the PTR server may be associated with the UBI policy. For example, the reward provided by the PTR server (e.g., in association with the insurance provider) may be a very low insurance premium associated with the UBI policy and/or an at least partial refund of the insurance premium associated with the UBI policy.

Accordingly, the PTR server not only makes taking public transportation easy for the user, the PTR server also provides rewards to the user based at least in part upon how often the user takes public transportation.

Examples of Public Transportation Route Application and Third Party Interactions The PTR application may display the public transportation schedule to the user (e.g., through a user interface associated with the user device) such that the user may interact with the public transportation schedule and the PTR server. For example, the PTR application may display multiple public transportation schedules for the user, and the user may choose which schedule to follow. The PTR application may also receive user input associated with the public transportation schedule. Further, the PTR application may display alerts and/or notices about the public transportation schedule associated with the user. For example, the PTR application may notify the user if a train of the public transportation schedule is running late or if construction is causing delays in bus routes of the public transportation schedule.

In some embodiments, the PTR server may be in communication with a plurality of third parties associated with the public transportation schedule associated with the user. For example, the public transportation schedule associated with the user may need the user to drive to a train stop or a bus stop if the user does not live and/or work near (e.g., within walking distance of) the train or bus stop. Accordingly, the PTR server may be in communication with a third party associated with parking around the train stop or bus stop such that the user may reserve a parking spot and/or view how busy parking lots around the train or bus stop are. Further, the PTR server may be in communication with a third party related to ride sharing (e.g., UBER or LYFT) or bike/scooter sharing (e.g., LIME, BIRD, or SPIN) such that the user can get to the train or bus stop without having to worry about parking.

Further, in some embodiments, the PTR server may create a usage competition for a plurality of users in the same area (e.g., having similar geolocations). The PTR server may retrieve the actual travel routes for the plurality of users and generate a competition for a certain length of time (e.g., a month, two months, etc.) based at least in part upon the percentage of time that the plurality of users follow the respective public transportation schedules. The PTR application may display a ranking associated with the users (e.g., from the highest usage to the lowest usage) and may therefore encourage the plurality of users to increase their usage of their public transportation schedules to win the competition. In some embodiments, a winner of the competition may receive an additional reward (e.g., in addition to the reward for the usage of the public transportation schedule).

At least one technical problem addressed by this system may include: (i) inability to easily determine one or more public transportation routes for users; (ii) inability to generate one or more public transportation routes for users without user input; (iii) inability to generate a public transportation schedule that incorporates an entire schedule of users, not just the commutes of users; (iv) lack of rewards based at least in part upon how often users take public transportation; and (v) lack of cooperation between multiple forms of public transportation, parking, ride sharing, and mobile transportation.

The methods and systems described herein may be implemented using computer programming or engineering techniques including computer software, firmware, hardware, or any combination thereof, where the technical effect may be achieved by performing at least one of the following steps: (a) receiving telematics data associated with a user, wherein the telematics data include location data associated with the user, and wherein the telematics data are received from at least one of a mobile device associated with the user, a vehicle associated with the user, and a public transportation vehicle utilized by the user, (b) generating, based at least in part upon the received telematics data, one or more travel patterns associated with the user, (c) retrieving one or more public transportation routes from the at least one memory device, wherein the one or more public transportation routes are associated with a location associated with the user, (d) comparing the one or more travel patterns and the one or more public transportation routes, and/or (e) generating a public transportation schedule for the user based at least in part upon the compared one or more travel patterns and the one or more public transportation routes.

At least one technical solution provided by this system may include: (i) providing users with a service that allows the users to easily determine publication transportation routes; (ii) generating public transportation schedules for users based at least in part upon passive user data (e.g., telematics data associated with the user); (iii) determining one or more travel patterns of users that incorporate the entirety of travel associated with the user (e.g., not just the commute associated with the user) and generating public transportation schedules that satisfy all transportation needs associated with the user; (iv) providing rewards to users based at least in part upon how often the users take public transportation; and/or (v) communication between multiple forms of public transportation, parking, ride sharing, and mobile transportation such that every aspect of travel for the user is managed.

Exemplary Computer Networks

FIG. 1 depicts a simplified block diagram of an exemplary system 100 for generating public transportation schedules for users. In the exemplary embodiment, system 100 may be used in generating public transportation schedules for users. System 100 may include a public transit route (PTR) server 102.

In the exemplary embodiment, PTR server 102 is in communication with a user device 108, an insurance provider device 114, and a third party device 116. PTR server 102 is also in communication with a database 106 and may communicate with database 106 through a database server 104. In some embodiments, database server 104 is a component of PTR server 102. In other embodiments, database server 104 is separate from PTR server 102. In some embodiments, system 100 may include a plurality of PTR servers 102, user devices 108, insurance provider devices 114, third party devices 116, and/or databases 106.

In the exemplary embodiment, user device 108 may be computers that include a web browser or a software application (e.g., a PTR application 110), which enables user device 108 to access remote computer devices, such as PTR server 102, using the Internet or other network. More specifically, user device 108 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User device 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Further, PTR server 102 may be communicatively coupled to user device 108 and may receive information (e.g., telematics data) from user device 108.

In the exemplary embodiment, PTR server 102 may interact with third party device 116 (e.g., a third party server) associated with third parties that provide a service (e.g., public transportation, UBER, LYFT, LIME, SPIN, BIRD, parking, etc.). For example, PTR server 102 may communicate with an application associated with third party device 116 to determine a public transportation schedule for the user and/or arrange services for the user. PTR server 102 and third party device 116 may be communicatively coupled to one another through the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Database server 104 may be communicatively coupled to database 106 that stores data. In one embodiment, database 106 may include telematics data, public transit data (e.g., public transit schedules and times), public transit routes, third party data, and reward data. In the exemplary embodiment, database 106 may be stored remotely from PTR server 102. In some embodiments, database 106 may be decentralized. In the exemplary embodiment, a user, may access database 106 via their user device 108 by logging onto PTR server 102, as described herein.

In the exemplary embodiment, user device 108 may include a PTR application 110 and a user interface 112. User interface 112 may be used, for example, to receive notifications from PTR server 102 and/or to input and select information (e.g., public transportation schedule selections and one or more preferences) to be sent to PTR server 102. PTR application 110 may be, for example, a program or application that runs on user device 108.

In some embodiments, PTR application 110 is accessed remotely by user device 108. PTR application 110 may be hosted by or stored on PTR server 102 and accessed by user device 108. For example, PTR application 110 may be stored on and executed by PTR server 102. User device 108 may provide inputs to PTR server 102 via a network which are used by PTR server 102 to execute PTR application 110. In one embodiment, these inputs may be received by a website hosted by PTR server 102. The website may further provide output to user device 108. User device 108 may have access to a website (e.g., hosted by PTR server 102), application (e.g., PTR application 110), or other tool which the user uses to receive and/or view determine public transportation schedules, user one or more preferences, alerts/notifications regarding the determined public transportation schedule, and/or competitions with other users, provided by PTR server 102 to the user. System 100 may be configured with additional, less, or alternate functionality, including that discussed elsewhere herein.

An insurance provider device 114 may be communicatively coupled with PTR server 102. In some embodiments, insurance provider device 114 may be associated with, or is part of a computer network associated with an insurance provider, or in communication with the insurance provider's computer network (not shown). In other embodiments, insurance provider device 114 may be associated with a third party and is merely in communication with the insurance provider's computer network. That is, insurance provider device 114 may be associated with an insurance provider associated with the user associated with user device 108. More specifically, insurance provider device 114 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Insurance provider device 114 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Exemplary Processes for Creating Driving Challenges

Figure 2:
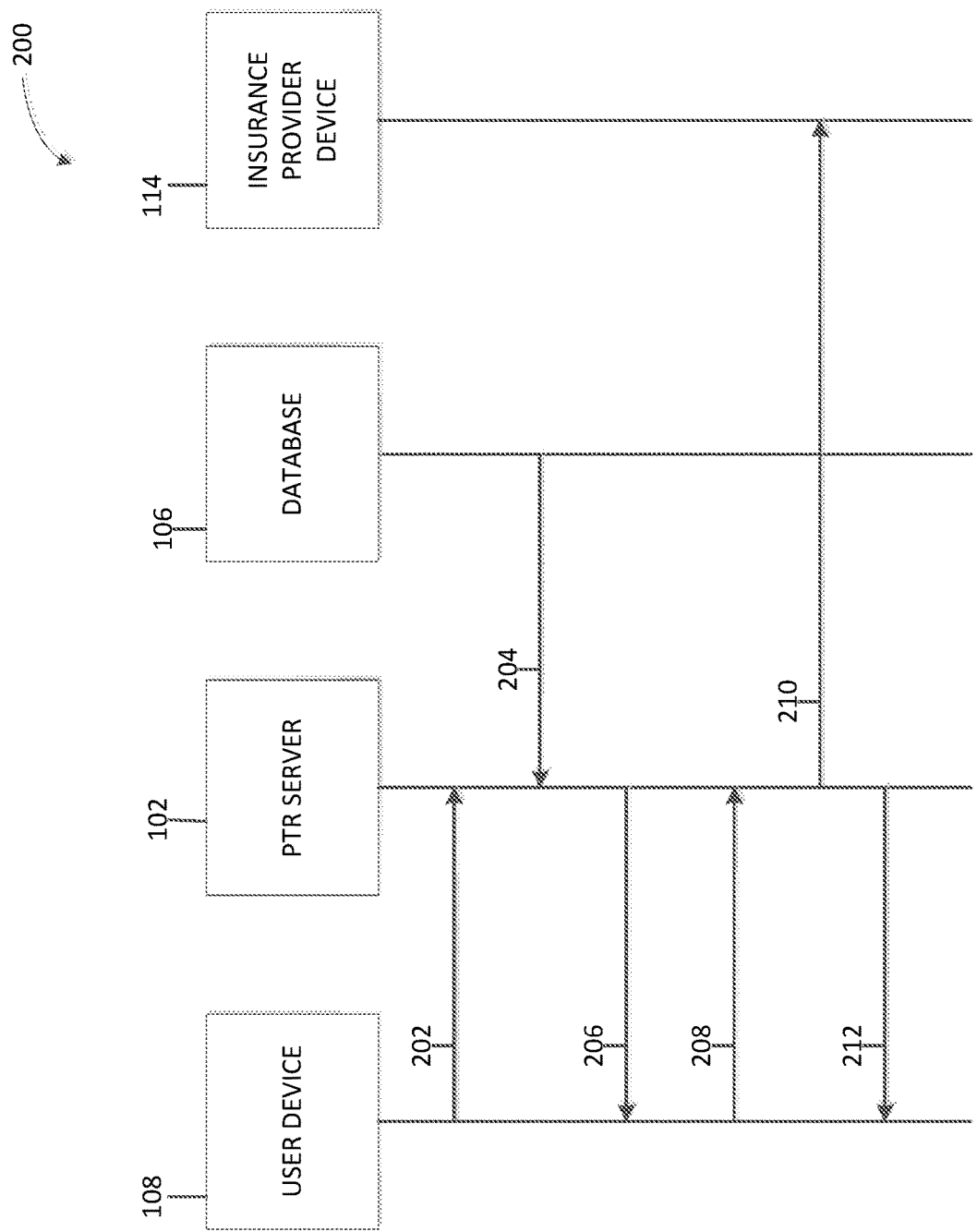
FIG. 2 illustrates a flow chart of an exemplary process that may be carried out by the computer system shown in FIG. 1.

FIG. 2 illustrates a flow chart of an exemplary process 200 for generating public transportation schedules for users. In the exemplary embodiment, process 200 may be carried out by PTR server 102, which may be in communication with user device 108, database 106, and insurance provider device 114.

PTR server 102 may receive telematics data 202 from user device 108. Telematics data 202 may include location data associated with a user of user device 108 and any data relating to vehicles driven by (e.g., a personal vehicle associated with the user) or ridden in (e.g., public transportation vehicles, personal mobility devices, ride sharing vehicles, etc.) the user. Based at least in part upon the received telematics data 202, PTR server 102 may generate one or more travel patterns associated with the user. One or more travel patterns may include locations where the user generally drives the vehicle, times associated with the frequent locations of the vehicle, a commute associated with the user, routine trips associated with the user in addition to the commute associated with the user, commute time associated with the user, average traffic associated with the commute associated with the user, when the user utilizes mass transit vehicles or other personal mobility devices (e.g., bikes or scooters), etc. PTR server 102 may retrieve one or more public transportation routes 204 (e.g., associated with cities, states, and/or areas associated with the user) from database 106. One or more public transportation routes 204 may be retrieved from websites, online databases, and/or mobile applications of the public transportation providers, and one or more public transportation routes 204 may include bus routes and schedules, train (e.g., subway, elevated train, underground, etc.) routes and schedules, streetcar routes and schedules, trolley routes and schedules, ferry routes and schedules, tram routes and schedules, rapid transit routes and schedules, personal mobility locations and pick-up/drop-off areas, and/or the route and schedule of any other mode of public transportation.

PTR server 102 may compare the one or more travel patterns associated with the user and retrieved one or more public transportation routes 204 to generate one or more public transportation schedules 206 (e.g., based at least in part upon commute, commute time, routine trips, and/or other generated one or more travel patterns associated with the user). PTR server 102 may transmit public transportation schedules 206 to user device 108 such that the user can follow public transportation schedule 206. PTR Public transportation schedule 206 may be a schedule for the user to follow that includes some public transportation, and public transportation schedule 206 may include specific trains and/or buses and times the user should take the trains and/or buses to follow the one or more travel patterns associated with the user.

After a certain period of time (e.g., a month, two months, six months, etc.), PTR server 102 may receive an actual route 208 from user device 108. Actual route 208 may be based at least in part upon telematics data (e.g., telematics data 202) received from user device 108 during the period of time. From actual route 208, PTR server 102 may determine a percentage of time 210 that the user followed public transportation schedule 206 during the period of time. PTR server 102 may transmit percentage of time 210 to insurance provider device 114 (e.g., associated with the user) and provide a reward 212 (e.g., on behalf of and/or in associated with an insurance provider associated with insurance provider device 114) to user device 108. In some embodiments, the user may have a usage-based insurance (UBI) policy through the insurance provider, and reward 212 may be a percentage off a premium of UBI policy and/or a credit toward a subsequent premium for UBI policy. In other embodiments, reward 212 may be any suitable reward (e.g., gift cards, prepaid cards, merchant coupons, cash rewards, etc.) for the user. In some embodiments, process 200 may include additional, less, or alternate actions, including those discussed elsewhere herein.

Exemplary Client Devices

Figure 3:
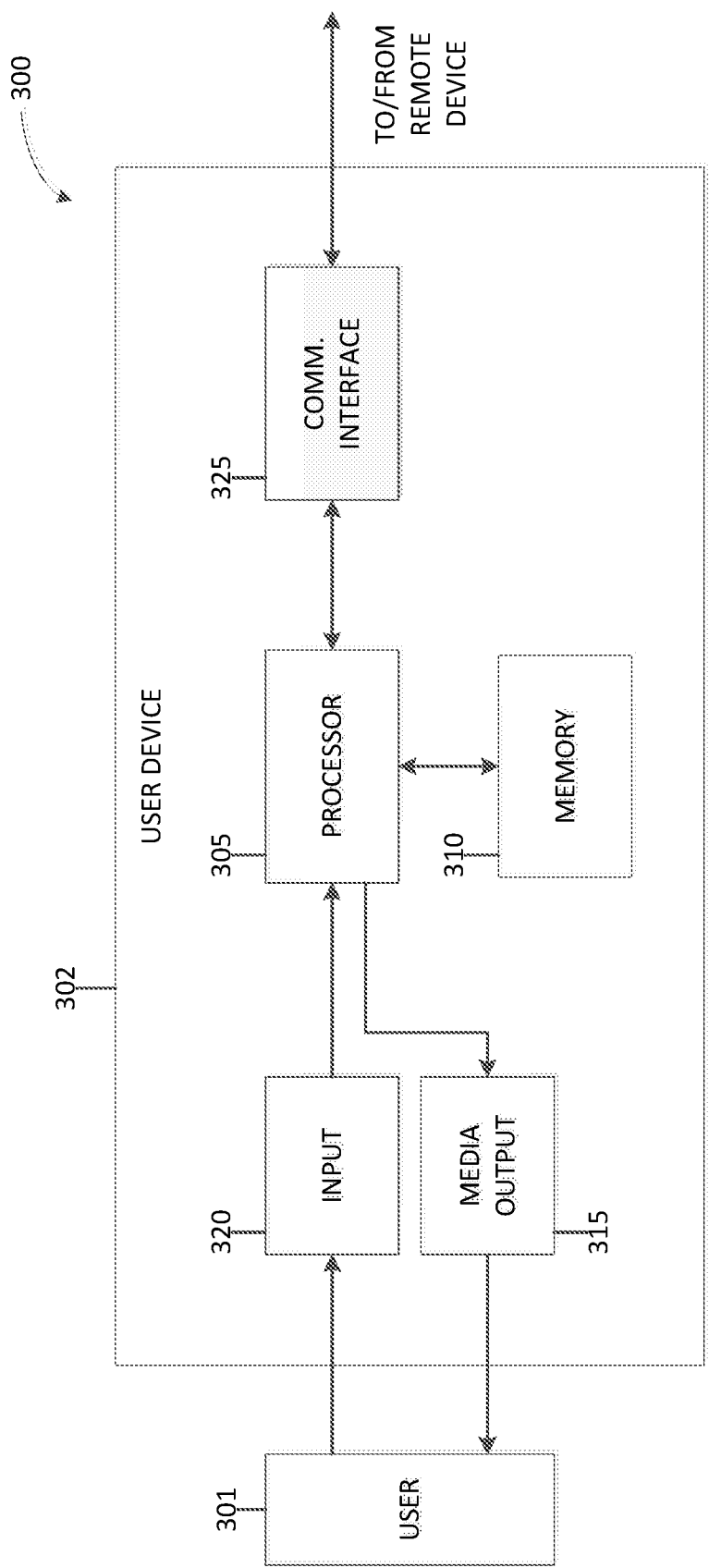
FIG. 3 illustrates an exemplary configuration associated with a user computer device in accordance with one embodiment of the present disclosure.

FIG. 3 depicts an exemplary configuration 300 associated with a user computer device 302, in accordance with one embodiment of the present disclosure. User device 302 may be operated by a user 301. User device 302 may include, but is not limited to, user device 108, insurance provider device 114, and/or third party device 116 (shown in FIG. 1). User device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

User device 302 may also include one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. In some embodiments, user device 302 may include an input device 320 for receiving input from user 301. User 301 may use input device 320 to, without limitation, view public transportation schedules, provide user input to PTR server 102 (shown in FIG. 1), and view usage competitions between other users.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User device 302 may also include a communication interface 325, communicatively coupled to a remote device such as PTR server 102 (shown in FIG. 1). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from PTR server 102. A client application (e.g., PTR application 110, shown in FIG. 1) may allow user 301 to interact with, for example, PTR server 102. For example, instructions may be stored by a cloud service, and the output of the execution of the instructions sent to the media output component 315.

Exemplary Server Devices

Figure 4:
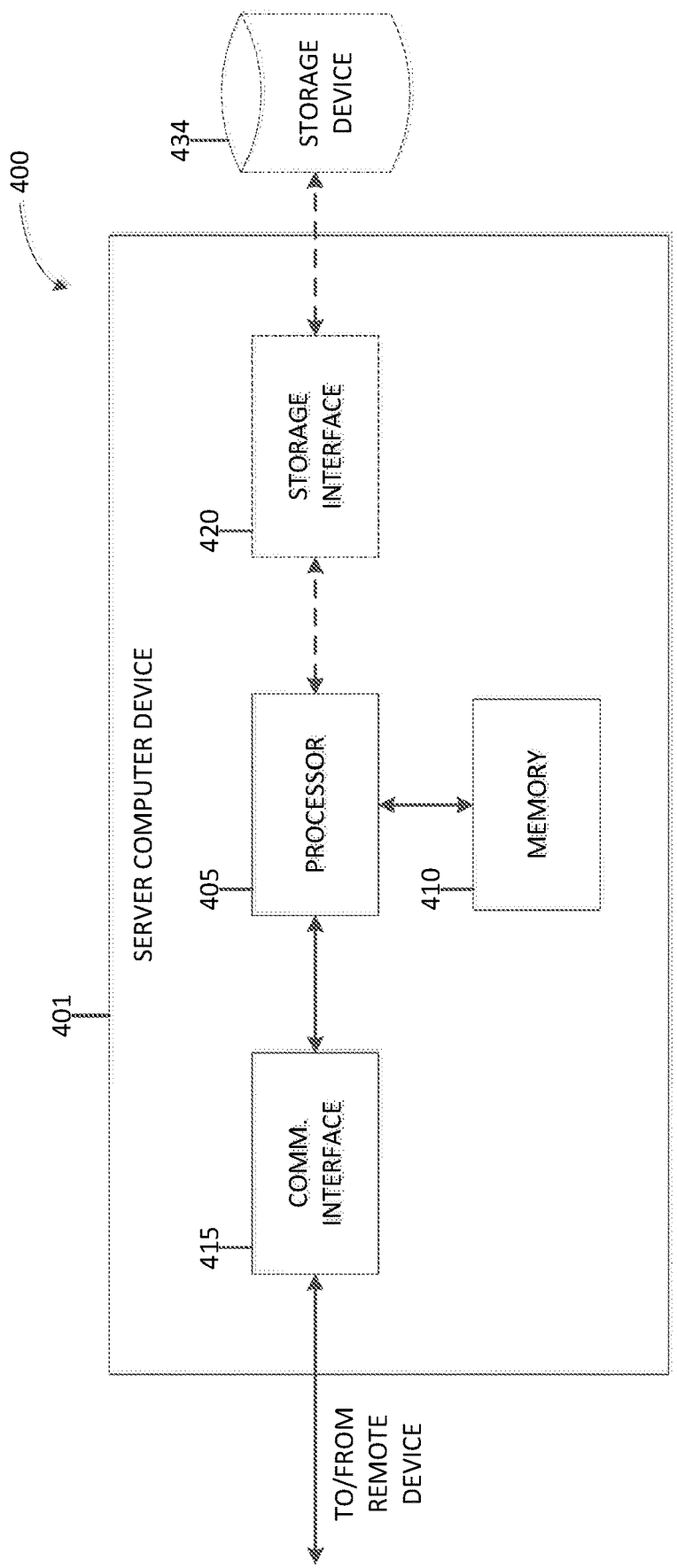
FIG. 4 illustrates an exemplary configuration of a server system in accordance with one embodiment of the present disclosure.

FIG. 4 depicts an exemplary configuration of server system 400, in accordance with one embodiment of the present disclosure. Server computer device 401 may include, but is not limited to, PTR server 102 and database server 104 (both shown in FIG. 2). Server computer device 401 may also include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 401 is capable of communicating with a remote device such as another server computer device 401 and PTR server 102. For example, communication interface 415 may receive requests from user device 108 via the Internet, as illustrated in FIG. 1.

Processor 405 may also be operatively coupled to a storage device 434. Storage device 434 may be any computer-operated hardware suitable for storing and/or retrieving data, such as, but not limited to, data associated with database 106 (shown in FIG. 1). In some embodiments, storage device 434 may be integrated in server computer device 401. For example, server computer device 401 may include one or more hard disk drives as storage device 434.

In other embodiments, storage device 434 may be external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 434 via a storage interface 420. Storage interface 420 may be any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 may execute computer-executable instructions for implementing aspects of the disclosure. In some embodiments, the processor 405 may be transformed into a special purpose microprocessor by executing computer-executable instructions or by otherwise being programmed.

Figure 6:
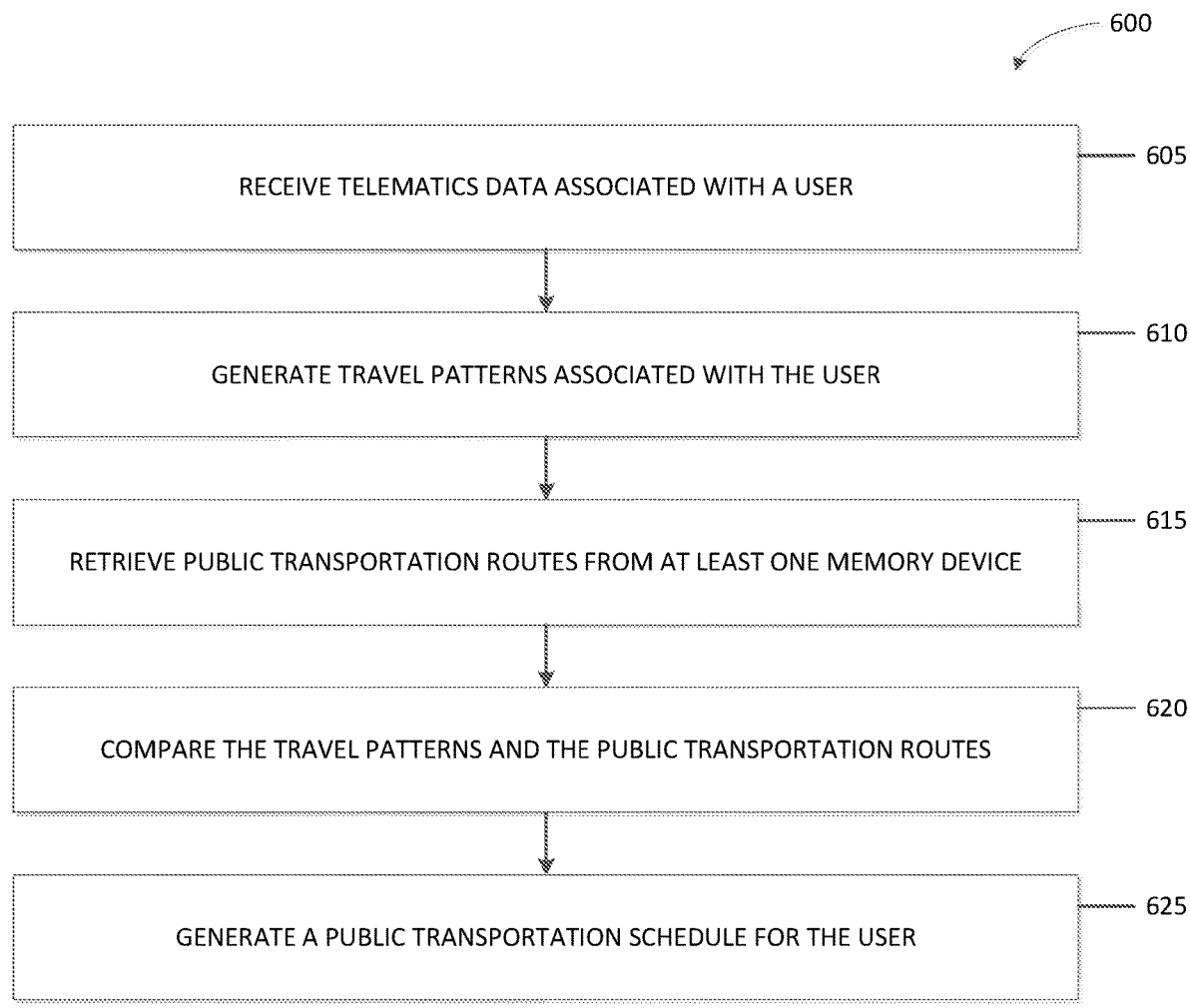
FIG. 6 illustrates a simplified block diagram of an exemplary process that may be carried out by the computer system shown in FIG. 1.

For example, the processor 405 may be programmed with the instruction such as illustrated in FIG. 6.

Exemplary Computer Devices

Figure 5:
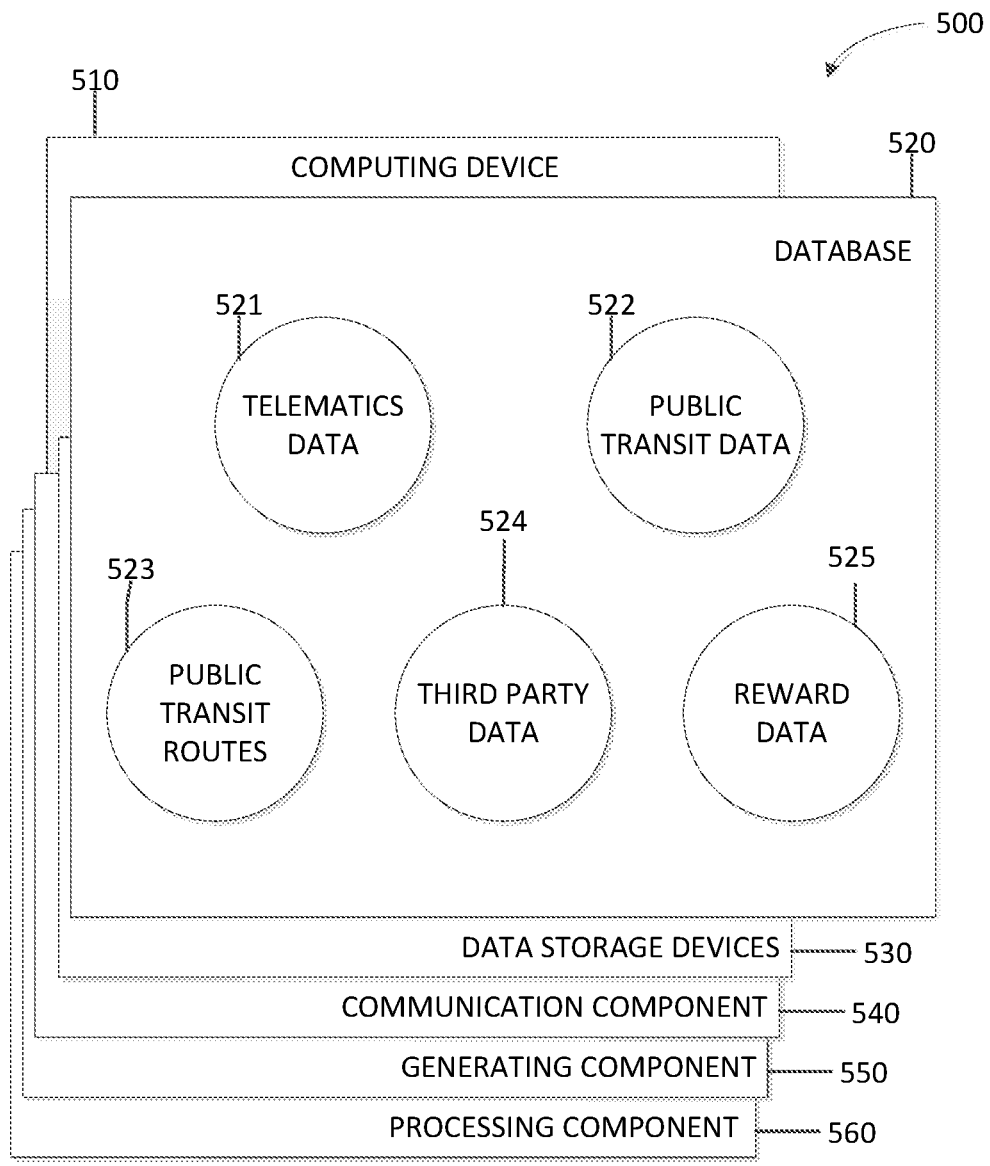
FIG. 5 illustrates a diagram of components of one or more exemplary computing devices that may be used in the computer system shown in FIG. 1.

FIG. 5 depicts a diagram 500 of components of one or more exemplary computing devices 510 that may be used in system 100 shown in FIG. 1 and to implement process 200 shown in FIG. 2. In some embodiments, computing device 510 may be similar to PTR server 102 (shown in FIG. 1). Database 520 may be coupled with several separate components within computing device 510, which perform specific tasks. In this embodiment, database 520 may include telematics data 521 (e.g., including location data and vehicle usage data associated with a user), public transit data 522 (e.g., data of routes and schedules of public transportation, which may be from public transportation resources), public transit routes 523 (e.g., public transit schedules generated for users), third party data 524, and reward data 525. In some embodiments, database 520 is similar to database 106 (shown in FIG. 1).

Computing device 510 may include the database 520, as well as data storage devices 530. Computing device 510 may also include a communication component 540 for communicating with different devices (e.g., user device 108, insurance provider device 114, and/or third party device 116, shown in FIG. 1). Computing device 510 may further include a generating component 550 for generating public transportation schedules for users. Moreover, computing device 510 may include a processing component 560 for processing, for example, telematics data and rewards and assisting with execution of computer-executable instructions associated with the system.

Exemplary Computer-Implemented Methods for Managing Driving Challenges

FIG. 6 illustrates a flow chart of an exemplary computer implemented process 600 for generating public transportation schedules for users using process 200 shown in FIG. 2. Process 600 may be implemented by a computing device, for example PTR server 102 (shown in FIG. 1). In the exemplary embodiment, PTR server 102 may be in communication with at least one user device 108 (shown in FIG. 1).

In the exemplary embodiment, process 600 may include receiving 605 telematics data associated with a user. The telematics data may include location data associated with the user, and the telematics data may be received from at least one of a mobile device associated with the user, a vehicle associated with the user, and a public transportation vehicle utilized by the user. One or more travel patterns may be generated 610 based at least in part upon the received 605 telematics data associated with the user. In some embodiments, one or more travel patterns may be generated 610 using machine learning and/or artificial intelligence techniques.

Process 600 may further include retrieving 615 one or more public transportation routes from at least one memory device. The one or more public transportation routes may be associated with a location associated with the user (e.g., determined by received 605 telematics data associated with the user) and may include one or more public transportation routes and times. Process may further include comparing 620 the generated 610 one or more travel patterns associated with the user and the retrieved 615 one or more public transportation routes. Further, process 600 may include generating 625 a public transportation schedule for the user. Process 600 may include additional, less, or alternate functionality, including that discussed elsewhere herein.

Exemplary Embodiments & Functionalities

In one aspect, a computer system for generating a public transportation schedule for users may be provided. The computer system may include one processor in communication with at least one memory device, and the at least one processor may be programmed to: (i) receive telematics data associated with a user, wherein the telematics data include location data associated with the user, and wherein the telematics data are received from at least one of a mobile device associated with the user, a vehicle associated with the user, and a public transportation vehicle utilized by the user, (ii) generate, based at least in part upon the received telematics data, one or more travel patterns associated with the user, (iii) retrieve one or more public transportation routes from the at least one memory device, wherein the one or more public transportation routes are associated with a location associated with the user, (iv) compare the one or more travel patterns and the one or more public transportation routes, and/or (v) generate a public transportation schedule for the user based at least in part upon the compared one or more travel patterns and the one or more public transportation routes. The system may include additional, less, or alternate functionality, including that discussed elsewhere herein.

For example, additional functionality may include the processor further being programmed to: (i) prompt, via an application on a mobile device associated with the user, the user to select one or more preferences for the public transportation schedule, (ii) update, based at least in part upon the one or more preferences, the public transportation schedule for the user, (iii) after the public transportation schedule is generated, track an actual travel route associated with the user based at least in part upon the telematics data associated with the user and the location data associated with the user, (iv) determine a percentage of time the user follows the generated public transportation schedule, (v) update the generated public transportation schedule for the user based at least in part upon the actual travel route associated with the user, (vi) retrieve a plurality of actual travel routes for a plurality of users, (vii) generate a competition for the plurality of users based at least in part upon a plurality of percentages of time the plurality of users follow their corresponding public transportation schedules, and (viii) provide a reward to the user for following the generated public transportation schedule, wherein the reward is based at least in part upon the percentage of time the user follows the public transportation schedule.

Further, generating the public transportation schedule for the user may include: (i) generating a plurality of public transportation schedules for the user, wherein each of the plurality of public transportation schedules is associated with a reward, (ii) prompting, via an application on a mobile device associated with the user, the user to select a public transportation schedule of the plurality of public transportation schedules, and (iii) providing the reward to the user based at least in part upon the selected public transportation schedule. The user may have a usage-based insurance (UBI) policy associated with an insurance premium through an insurance provider, and the reward may include one of a discount of the insurance premium and a credit toward the insurance premium.

In another aspect, a computer-based method for generating a public transportation schedule for users may be provided. The method may be implemented on a computer device including one processor in communication with at least one memory device, and the method may include: (i) receiving telematics data associated with a user, wherein the telematics data include location data associated with the user, and wherein the telematics data are received from at least one of a mobile device associated with the user, a vehicle associated with the user, and a public transportation vehicle utilized by the user, (ii) generating, based at least in part upon the received telematics data, one or more travel patterns associated with the user, (iii) retrieving one or more public transportation routes from the at least one memory device, wherein the one or more public transportation routes are associated with a location associated with the user, (iv) comparing the one or more travel patterns and the one or more public transportation routes, and/or (v) generating a public transportation schedule for the user based at least in part upon the compared one or more travel patterns and the one or more public transportation routes. The method may include additional, less, or alternate functionality, including that discussed elsewhere herein.

In yet another aspect, at least one non-transitory computer-readable storage media having computer-executable instructions embodied thereon may be provided. When executed by at least one processor in communication with at least one memory device, the computer-executable instructions may cause the at least one processor to: (i) receive telematics data associated with a user, wherein the telematics data include location data associated with the user, and wherein the telematics data are received from at least one of a mobile device associated with the user, a vehicle associated with the user, and a public transportation vehicle utilized by the user, (ii) generate, based at least in part upon the received telematics data, one or more travel patterns associated with the user, (iii) retrieve one or more public transportation routes from the at least one memory device, wherein the one or more public transportation routes are associated with a location associated with the user, (iv) compare the one or more travel patterns and the one or more public transportation routes, and/or (v) generate a public transportation schedule for the user based at least in part upon the compared one or more travel patterns and the one or more public transportation routes. The instructions may instruct additional, less, or alternate functionality, including that discussed elsewhere herein.

Examples of Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, driver and/or vehicle, documents to be provided, the model being simulated, home owner and/or home, buyer, geolocation information, image data, home sensor data, and/or other data.

Based at least in part upon these analyses, the processing element may learn how to identify characteristics and patterns that may then be applied to training models, analyzing sensor data, authentication data, image data, mobile device data, and/or other data.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

I claim:

1. A computer system for generating a public transportation schedule, the computer system including at least one processor in communication with at least one memory device, wherein the at least one processor is programmed to:
    receive telematics data associated with a user, wherein the telematics data include location data associated with the user, and wherein the telematics data are received from at least one selected from a group consisting of a mobile device associated with the user, a vehicle associated with the user, and a public transportation vehicle utilized by the user;
    generate, based at least in part upon the telematics data, as received, one or more travel patterns associated with the user by applying a trained machine learning model to the telematics data by at least:
        applying the trained machine learning model to the telematics data to generate a first travel pattern for a first day of a week including a plurality of first locations; and
        applying the trained machine learning model to the telematics data to generate a second travel pattern for a second day of the week including a plurality of second locations, wherein at least one second location of the plurality of second locations are different from any first location of the plurality of first locations;
    wherein:
        the trained machine learning model is trained by historical location data and corresponding historical time data extracted from historical telematics data including the historical location data;
        the second day of the week is different from the first day of the week;
        the first day of the week is a current day of the week; and
        the second travel pattern is different from the first travel pattern;
    retrieve one or more public transportation routes for the current day from the at least one memory device, wherein the one or more public transportation routes include one or more transit stops associated with one or more locations identified in the first travel pattern associated with the user;
    compare the first travel pattern and the one or more public transportation routes;
    generate a plurality of public transportation schedules for the current day for the user based at least in part upon the first travel pattern, the one or more public transportation routes, and a real-time traffic condition associated with the one or more transit stops and the first travel pattern, wherein each of the plurality of public transportation schedules comprises the one or more transit stops;
    cause a user interface to be executed on a user device of the user to display the plurality of public transportation schedules and to receive a selection from the user of the public transportation schedule from the plurality of public transportation schedules;
    after receiving the selection of the public transportation schedule, (a) display the public transportation schedule, as selected, for the user to follow and (b) track, during multiple weeks occurring after the week, an actual travel route associated with the user during the first day of the multiple weeks to determine a percentage of time the user follows the public transportation schedule;

in response to determining the percentage of the time being below a predetermined threshold:
  cause the user interface to prompt the user to provide a reason why the user is not following the public transportation schedule;
  update the public transportation schedule associated with the user based at least in part upon the reason provided by the user; and
  cause the user interface to display the public transportation schedule, as updated; and upon receiving, from a public transportation provider, a real-time update associated with a delay or a disruption in the public transportation schedule based on the real-time traffic condition:
  update the public transportation schedule based at least in part on the real-time update; and
  cause the user interface to display the public transportation schedule, as updated, and a real-time alert to the user.

2. The computer system of claim 1, wherein the at least one processor is further programmed to:
  cause the user interface to prompt, via an application on the mobile device associated with the user, the user to select one or more preferences for the public transportation schedule; and
  update, based at least in part upon the one or more preferences, the public transportation schedule for the user.

3. The computer system of claim 1, wherein the at least one processor is further programmed to:
  update the one or more travel patterns for the user based at least in part upon the actual travel route associated with the user.

4. The computer system of claim 3, wherein the processor is further programmed to generate a subsequent public transportation schedule for a subsequent trip based at least in part upon the one or more travel patterns, as updated.

5. The computer system of claim 1, wherein the at least one processor is further programmed to:
  retrieve a plurality of actual travel routes for a plurality of users;
  generate a competition for the plurality of users based at least in part upon a plurality of percentages of time the plurality of users follow their corresponding public transportation schedules; and
  cause the user interface to display to the user a ranking associated with the user in the competition for the plurality of the users.

6. The computer system of claim 1, wherein the at least one processor is further programmed to:
  provide a reward to the user for following the public transportation schedule, wherein the reward is based at least in part upon the percentage of time the user follows the public transportation schedule.

7. The computer system of claim 6, wherein to generate the public transportation schedule for the user includes to:
  provide the reward to the user based at least in part upon the public transportation schedule, as selected, wherein:
    each of the plurality of public transportation schedules is associated with a respective reward;
    the reward is associated with the public transportation schedule; and
    causing the user interface to display the plurality of public transportation schedules comprises causing the user interface to display the respective reward with each of the plurality of public transportation schedules.

8. The computer system of claim 7, wherein the user has a usage-based insurance (UBI) policy associated with an insurance premium through an insurance provider, and wherein the reward includes at least one of a discount of the insurance premium or a credit toward the insurance premium.

9. A method for generating a public transportation schedule, said method implemented on a computer device including one processor in communication with at least one memory device, said method comprising:
  receiving telematics data associated with a user, wherein the telematics data include location data associated with the user, and wherein the telematics data are received from at least one selected from a group consisting of a mobile device associated with the user, a vehicle associated with the user, and a public transportation vehicle utilized by the user;
  generating, based at least in part upon the telematics data, as received, one or more travel patterns associated with the user by applying a trained machine learning model to the telematics data by at least:
    applying the trained machine learning model to the telematics data to generate a first travel pattern for a first day of a week including a plurality of first locations; and
    applying the trained machine learning model to the telematics data to generate a second travel pattern for a second day of the week including a plurality of second locations, wherein at least one second location of the plurality of second locations are different from any first location of the plurality of first locations;
  wherein:
    the trained machine learning model is trained by historical location data and corresponding historical time data extracted from historical telematics data including the historical location data;
    the second day of the week is different from the first day of the week;
    the first day of the week is a current day of the week; and
    the second travel pattern is different from the first travel pattern;
  retrieving one or more public transportation routes for the current day from the at least one memory device, wherein the one or more public transportation routes include one or more transit stops associated with one or more locations identified in the first travel pattern associated with the user;
  comparing the first travel pattern and the one or more public transportation routes;
  generating a plurality of public transportation schedules for the current day for the user based at least in part upon the first travel pattern, the one or more public transportation routes, and a real-time traffic condition associated with the one or more transit stops and the first travel pattern, wherein each of the plurality of public transportation schedules comprises the one or more transit stops;
  causing a user interface to be executed on a user device of the user to display the plurality of public transportation schedules and to receive a selection from the user of the public transportation schedule from the plurality of public transportation schedules;

after receiving the selection of the public transportation schedule, (a) displaying the public transportation schedule, as selected, for the user to follow and (b) tracking, during multiple weeks occurring after the week, an actual travel route associated with the user during the first day of the multiple weeks to determine a percentage of time the user follows the public transportation schedule;

in response to determining the percentage of the time being below a predetermined threshold:
causing the user interface to prompt the user to provide a reason why the user is not following the public transportation schedule;
updating the public transportation schedule associated with the user based at least in part upon the reason provided by the user; and
causing the user interface to display the public transportation schedule, as updated; and upon receiving, from a public transportation provider, a real-time update associated with a delay or a disruption in the public transportation schedule based on the real-time traffic condition:
updating the public transportation schedule based at least in part on the real-time update; and
causing the user interface to display the public transportation schedule, as updated, and a real-time alert to the user.

10. The method of claim 9 further comprising:
causing the user interface to prompt, via an application on the mobile device associated with the user, the user to select one or more preferences for the public transportation schedule; and
updating, based at least in part upon the one or more preferences, the public transportation schedule for the user.

11. The method of claim 9 further comprising:
updating the one or more travel patterns for the user based at least in part upon the actual travel route associated with the user.

12. The method of claim 11, further comprising generating a subsequent public transportation schedule for a subsequent trip based at least in part upon the one or more travel patterns, as updated.

13. The method of claim 9 further comprising:
retrieving a plurality of actual travel routes for a plurality of users;
generating a competition for the plurality of users based at least in part upon a plurality of percentages of time the plurality of users follow their corresponding public transportation schedules; and
causing the user interface to display to the user a ranking associated with the user in the competition for the plurality of the users.

14. The method of claim 9 further comprising:
providing a reward to the user for following the public transportation schedule wherein the reward is based at least in part upon the percentage of time the user follows the public transportation schedule.

15. The method of claim 14, wherein generating the public transportation schedule for the user includes:
providing the reward to the user based at least in part upon the public transportation schedule, as selected, wherein:
each of the plurality of public transportation schedules is associated with a respective reward;
the reward is associated with the public transportation schedule; and
causing the user interface to display the plurality of public transportation schedules comprises causing the user interface to display the respective reward with each of the plurality of public transportation schedules.

16. At least one non-transitory computer-readable storage media having computer-executable instructions embodied thereon, wherein when executed by at least one processor in communication with at least one memory device, the computer-executable instructions cause the at least one processor to:

receive telematics data associated with a user, wherein the telematics data include location data associated with the user, and wherein the telematics data are received from at least one selected from a group consisting of a mobile device associated with the user, a vehicle associated with the user, and a public transportation vehicle utilized by the user;

generate, based at least in part upon the telematics data, as received, one or more travel patterns associated with the user by applying a trained machine learning model to the telematics data by at least:
applying the trained machine learning model to the telematics data to generate a first travel pattern for a first day of a week including a plurality of first locations; and
applying the trained machine learning model to the telematics data to generate a second travel pattern for a second day of the week including a plurality of second locations, wherein at least one second location of the plurality of second locations are different from any first location of the plurality of first locations;
wherein:
the trained machine learning model is trained by historical location data and corresponding historical time data extracted from historical telematics data including the historical location data;
the second day of the week is different from the first day of the week;
the first day of the week is a current day of the week; and
the second travel pattern is different from the first travel pattern;

retrieve one or more public transportation routes for the current day from the at least one memory device, wherein the one or more public transportation routes include one or more transit stops associated with one or more locations identified in the first travel pattern associated with the user;

compare the first travel pattern and the one or more public transportation routes;

generate a plurality of public transportation schedules for the current day for the user based at least in part upon the first travel pattern, the one or more public transportation routes, and a real-time traffic condition associated with the one or more transit stops and the first travel pattern, wherein each of the plurality of public transportation schedules comprises the one or more transit stops;

cause a user interface to be executed on a user device of the user to display the plurality of public transportation schedules and to receive a selection from the user of the public transportation schedule from the plurality of public transportation schedules;

after receiving the selection of the public transportation schedule, (a) display the public transportation schedule, as selected, for the user to follow and (b) track, during multiple weeks occurring after the week, an actual travel route associated with the user during the first day of the multiple weeks to determine a percentage of time the user follows the public transportation schedule;

in response to determining the percentage of the time being below a predetermined threshold:

cause the user interface to prompt the user to provide a reason why the user is not following the public transportation schedule;

update the public transportation schedule associated with the user based at least in part upon the reason provided by the user; and cause the user interface to display the public transportation schedule, as updated; and upon receiving, from a public transportation provider, a real-time update associated with a delay or a disruption in the public transportation schedule based on the real-time traffic condition:

update the public transportation schedule based at least in part on the real-time update; and cause the user interface to display the public transportation schedule, as updated, and a real-time alert to the user.

17. The at least one non-transitory computer-readable storage media of claim 16, wherein the computer-executable instructions further cause the at least one processor to:

cause the user interface to prompt, via an application on the mobile device associated with the user, the user to select one or more preferences for the public transportation schedule; and update, based at least in part upon the one or more preferences, the public transportation schedule for the user.

18. The at least one non-transitory computer-readable storage media of claim 16, wherein the computer-executable instructions further cause the at least one processor to:

update the one or more travel patterns for the user based at least in part upon the actual travel route associated with the user.

19. The at least one non-transitory computer-readable storage media of claim 18, wherein the computer-executable instructions further cause the at least one processor to generate a subsequent public transportation schedule for a subsequent trip based at least in part upon the one or more travel patterns, as updated.

20. The at least one non-transitory computer-readable storage media of claim 16, wherein the computer-executable instructions further cause the at least one processor to:

retrieve a plurality of actual travel routes for a plurality of users;

generate a competition for the plurality of users based at least in part upon a plurality of percentages of time the plurality of users follow their corresponding public transportation schedules; and cause the user interface to display to the user a ranking associated with the user in the competition for the plurality of users.

* * * * *